United States Patent [19]

Drozda

[11] Patent Number: 4,664,706

[45] Date of Patent: May 12, 1987

[54] SINTERED SHRINK-ON CAM AND PROCESS OF MANUFACTURING SUCH CAM

[75] Inventor: Manfred Drozda, Gmunden, Austria

[73] Assignee: Miba Sintermetall Aktiengesellschaft, Laakirchen, Austria

[21] Appl. No.: 850,038

[22] Filed: Apr. 10, 1986

[30] Foreign Application Priority Data

Apr. 30, 1985 [AT] Austria ................................ 1282/85

[51] Int. Cl.$^4$ ............................................. C22C 29/00
[52] U.S. Cl. ........................................ 75/246; 74/567; 75/240; 75/241; 75/243; 419/38; 419/54
[58] Field of Search ................... 74/567; 75/240, 246, 75/241, 243; 419/38, 54

[56] References Cited

U.S. PATENT DOCUMENTS 4,236,923 12/1980 Takahashi ............................ 419/47
4,595,556 6/1986 Umeha et al. ........................ 419/46

Primary Examiner—Stephen J. Lechert, Jr.
Attorney, Agent, or Firm—Kurt Kelman

[57] ABSTRACT

Cams which meet all strength requirements and can be shrunk on a shaft can be made in a simple manner by sintering from a nickel- and copper-free mixture which comprises iron powder and contains 0.3 to 1.0 weight percent carbon and molybdenum and/or tungsten in such amounts that the sum of the molybdenums content and the tungsten content multiplied with the ratio of the atomic weight of molybdenum to the atomic weight of tungsten lies between 0.5 and 3 weight percent.

4 Claims, No Drawings

SINTERED SHRINK-ON CAM AND PROCESS OF MANUFACTURING SUCH CAM

BACKGROUND OF THE INVENTION

1. Field of the Invention

This invention relates to a cam to be shrunk on a camshaft and to a process for sintering such cam.

2. Description of the Prior Art

A practice in which cams of a camshaft are made as separate components and shrunk on a preferably tubular shaft will afford considerable advantages as regards the manufacture and the weight of the camshaft. For such a manufacture of the camshaft the cams must be made in a relatively simple manner and with the required precision from a material which will withstand the loads to be encountered. Cams made as separate parts may be made by a sintering process. But it is difficult to provide sintered cams which have the required strength and the required precision. To provide a material having the required strength, the porosity of the sintered member must be low and the alloying elements added to the steel must be distributed as homogeneously as possible. Said requirements can be met by a liquid-phase sintering process because the sintering in the liquid phase ensures a high diffusion rate and a quick coagulation at the pores. But the resulting high-density sintering involves a substantial shrinkage so that the sintered members may not have the required dimensional stability. For this reason, shrink-on cams cannot be made by a liquid-phase sintering process in which a liquid phase is permanently maintained. Besides, known high-strength sintered steels, which contain, e.g., 4.5 weight percent nickel, 1.5 weight percent copper, 0.5 weight percent molybdenum and 0.4 to 0.7 weight percent carbon, do not meet the strength requirements for cams and exhibit bad tempering properties. Tests have shown that cams made of such sintered steels when subjected to the load reversals to be expected have a useful life of less than 150 hours, which is entirely unsatisfactory.

SUMMARY OF THE INVENTION

It is an object of the invention to avoid said disadvantages and to provide shrink-on cams made of a sintered material which meets all requirements regarding strength and temperature resistance.

Another object of the invention is to provide a simple process of sintering such cams.

The first object mentioned above is accomplished in accordance with the invention in that the cam consists of an nickel- and copper-free, sintered powder mixture which comprises iron powder and contains 0.3 to 1.0 weight percent carbon and molybdenum and/or tungsten in such amounts that the sum of the molybdenum content and the tungsten content multiplied with the ratio of the atomic weight of molybdenum to the atomic weight of tungsten lies between 0.5 and 3 weight percent.

It has surprisingly been found that a sintered material having that specific composition will have excellent hardenability, excellent tempering properties and an excellent impact strength. That alloy has a much higher resistance to Hertzian compressive stress than comparable chromium alloy steels or carbonitrided sintered materials. Molybdenum may be replaced by tungsten, which in comparison to the molybdenum results in certain advantages regarding the tempering properties of the cams. But tungsten must replace the molybdenum in an amount which is larger in accordance with the ratio of the atomic weights of said elements. This means that molybdenum must be replaced by approximately twice the quantity of tungsten.

The strength properties depend, inter alia, on the homogeneity with which the molybdenum can be distributed. To permit a suitable sintered material to be made in a simple manner, the nickel- and copper-free mixture which comprises iron powder and contains 0.3 to 1 weight percent carbon and at least one alloying element selected from the group consisting of molybdenum and tungsten in such amounts that the sum of the molybdenum content and the tungsten content multiplied with the ratio of the atomic weight of molybdenum to the atomic weight of tungsten lies between 0.5 and 3.0 weight percent is compacted to form a compact having an apparent specific gravity of at least 7.2 g/cm$^3$ and the compact is sintered at a temperature which is higher than the eutectic point of the mixture of iron and intermediate molybdenum carbide and/or tungsten carbide and below the solidus point of the adjacent ternary or quaternary system when said system is in the state of equilibrium.

The use of that sintering temperature, which in most cases will lie between 1230° and 1280° C., will ensure that the intermediate molybdenum carbide and/or tungsten carbide formed at all temperatures in question will form with iron a liquid phase, which is required for a rapid homogeneous distribution of molybdenum and/or tungsten. But as the sintering temperature lies below the solidus point of the ternary or quaternary system consisting of gamma iron with dissolved carbon, molybdenum and/or tungsten, when said system is in the state of equilibrium, the liquid phase which is formed cannot be permanent. The liquid phase consisting of iron and molybdenum carbide and/or tungsten carbide is very quickly incorporated in the structure as a solid solution and with an almost homogeneous distribution of molybdenum and/or tungsten. As a result, the desired dimensional stability can readily be ensured in conjunction with a relatively low porosity. Owing to the absence of a phase which is liquid throughout the sintering operation, there is hardly a shrinkage and the void ratio will depend only on the density to which the powder is compacted and which should be at least 7.2 g/cm$^3$.

Particularly desirable conditions will be obtained if the mixture contains iron powder, 0.7 to 0.9 weight percent carbon and molybdenum and/or tungsten in such amounts that the sum of the molybdenum content and the tungsten content multiplied with the ratio of the atomic weight of molybdenum to the atomic weight of tungsten lies between 1 to 1.5 weight percent. Such a sintered material can be heat-treated to have a Rockwell hardness number in excess of HRC 40 and a fatigue strength in excess of 400 MPa under rotating bending loads. Experience has shown that said properties are required for cams having an adequate strength. The heat treatment is carried out under such conditions that the hardness of the cams will not be decreased by the heating effected to shrink the cams on the camshaft and by the operating conditions of the camshaft.

EXAMPLE 1

Cams were made from a metal powder mixture which contained 1.5 weight percent molybdenum, 0.7 weight percent graphite, 0.5 weight percent of a conventional compacting aids, balance iron. Under a pressure of 1000

MPa that powder mixture was compacted to form molded compacts having a green density of 7.35 g/cm$^3$. The molded compacts were sintered in a sintering furnace at a sintering temperature of 1250° C. for 1.5 hours.

When the cams had been cooled to room temperature they were subsequently held at a temperature of 880° C. for 0.5 hours and were then hardened in oil to a Rockwell hardness number of HRC 55. To temper the cams, they were heated at 300° C. for 0.5 hours. A Rockwell hardness number HRC 40 was measured after the tempering.

EXAMPLE 2

The metal powder mixture used in Example 2 was similar to that used in Example 1 but molybdenum was replaced by tungsten in an amount which is larger by a factor that is equal to the ratio of the atomic weight of tungsten to the atomic weight of molybdenum. This means that the metal powder mixture contained 3 weight percent tungsten rather than 1.5 weight percent molybdenum. The mixture was again compacted under a pressure of 1000 MPa to form molded compacts having a green density of 7.40 g/cm$^3$. Said compacts were sintered at a sintering temperature of 1260° C. for a sintering time of 3 hours. When the sintering compacts had been hardened in oil for 0.5 hours at a temperature of 880° C., a Rockwell hardness number of HRC 58 was measured. When the cams had been tempered at 300° C. for 0.5 hours, they had a hardness of HRC 47.

The cams made in Example 1 and 2 were shrunk on a shaft and were then tested in a camshaft test stand and in an operating engine for up to 1500 hours. Excellent wear patterns were obtained in said tests. In dependence on the kind of engine and the test programm, the trial runs involved cyclic loads between 50 and 700 MPa at frequencies of 6 to 50 Hz.

The embodiments of the invention in which an exclusive property or privilege is claimed are defined as follows:

1. In a sintered shrink-on cam,
    the improvement residing in that
    the cam consists of a sintered powder compact which is free of nickel and copper and contains iron, 0.3 to 1.0 weight percent carbon, and at least one alloying element selected from the group consisting of molybdenum and tungsten in such amounts that the sum of the molybdenum content and the tungsten content multiplied with the ratio of the atomic weight of molybdenum to the atomic weight of tungsten lies between 0.5 and 3 weight percent.

2. The improvement set forth in claim 1, wherein said compact contains at least one alloying element selected from the group consisting of molybdenum and tungsten in such amounts that the sum of the molybdenum content and the tungsten content multiplied with the ratio of the atomic weight of molybdenum to the atomic weight of tungsten lies between 1 to 1.5 weight percent.

3. In a process of manufacturing a sintered shrink-on cam by compacting a powder mixture which comprises iron and at least 0.3 weight percent carbon to form powder compacts and sintering said powder compacts,
    the improvement residing in that
    a powder mixture is provided which is free of nickel and copper and comprises iron and contains 0.3 to 1.0 weight percent carbon and at least one alloying element selected from the group consisting of molybdenum and tungsten in such amounts that the sum of the molybdenum content and the tungsten content multiplied with the ratio of the atomic weight of molybdenum to the atomic weight of tungsten lies between 0.5 and 3 weight percent,
    said powder mixture is compacted to form powder compacts having an apparent specific gravity of at least 7.2 g/cm$^3$,
    said compacts are heated to form temporarily a eutectic mixute including iron and at least one intermediate compound of the group consisting of molybdenum carbide and tungsten carbide and is heated above the eutectic point of said eutectic mixture to a sintering temperature which is below the solidus point of an adjacent system which consists of gamma iron with dissolved carbon and at least one alloying element of the group consisting of molybdenum and tungsten when said system is in the state of euilibrium.

4. The improvement set forth in claim 3, wherein said powder mixture contains at least one alloying element selected from the group consisting of molybdenum and tungsten in such amounts that the sum of the molybdenum content and the tungsten content multiplied with the ratio of the atomic weight of molybdenum to the atomic weight of tungsten lies between 1 to 1.5 weight percent.

* * * * *